US008956583B2

(12) United States Patent
Asano et al.

(10) Patent No.: US 8,956,583 B2
(45) Date of Patent: Feb. 17, 2015

(54) METHOD FOR SEPARATING RHENIUM AND ARSENIC, AND METHOD FOR PURIFICATION OF RHENIUM

(71) Applicant: Sumitomo Metal Mining Co., Ltd., Tokyo (JP)

(72) Inventors: Satoshi Asano, Ehime (JP); Naoki Kubota, Ehime (JP); Kazunori Takeda, Ehime (JP); Shintarou Komori, Ehime (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 14/368,468

(22) PCT Filed: Feb. 15, 2013

(86) PCT No.: PCT/JP2013/053634
§ 371 (c)(1),
(2) Date: Jun. 24, 2014

(87) PCT Pub. No.: WO2013/129130
PCT Pub. Date: Sep. 6, 2013

(65) Prior Publication Data
US 2014/0356260 A1    Dec. 4, 2014

(30) Foreign Application Priority Data
Mar. 2, 2012 (JP) ................. 2012-046645

(51) Int. Cl.
*C22B 61/00* (2006.01)
*C22B 3/44* (2006.01)
(52) U.S. Cl.
CPC .. *C22B 61/00* (2013.01); *C22B 3/44* (2013.01)
USPC ............................................ 423/49; 423/87

(58) Field of Classification Search
None
See application file for complete search history.

(56) References Cited

U.S. PATENT DOCUMENTS

| 2010/0175509 A1 | 7/2010 | Abumiya et al. |
| 2010/0196230 A1 | 8/2010 | Abumiya et al. |

(Continued)

FOREIGN PATENT DOCUMENTS

| GB | 332627 | * 7/1930 |
| JP | A-7-70665 | 3/1995 |

(Continued)

OTHER PUBLICATIONS

International Search Report dated May 14, 2013 from International Application No. PCT/JP2013/053634 (with English-language translation).

(Continued)

*Primary Examiner* — Steven Bos
(74) *Attorney, Agent, or Firm* — Oliff PLC

(57) ABSTRACT

The present invention aims at separating and removing arsenic in a stable form from raw material containing rhenium and arsenic, and reducing a circulation amount of arsenic in a rhenium purification process to obtain rhenium with low-content arsenic. A method for separating rhenium from arsenic in a rhenium purification process, wherein the raw material containing rhenium and arsenic is oxidized and leached, and separated into a leachate containing perrhenic, arsenic, and arsenous acids and a leaching residue containing arsenate, followed by purification of rhenium from the leachate, wherein an alkali is added to the leachate to obtain an arsenic-containing precipitate and a rhenium-containing solution, rhenium is separated from the obtained rhenium-containing solution, an alkali is added to either or both obtained arsenic-containing precipitate and the leaching residue containing arsenate to obtain an arsenic-containing solution and a hydroxide precipitate, and arsenic in the obtained arsenic-containing solution is fixed as a precipitate.

8 Claims, 3 Drawing Sheets

(56) References Cited

U.S. PATENT DOCUMENTS

| | | |
|---|---|---|
| 2010/0196231 A1 | 8/2010 | Abumiya et al. |
| 2010/0215570 A1 | 8/2010 | Abuyima et al. |
| 2010/0266484 A1 | 10/2010 | Abumiya et al. |

FOREIGN PATENT DOCUMENTS

| | | |
|---|---|---|
| JP | A-7-286221 | 10/1995 |
| JP | A-2008-105921 | 5/2008 |
| JP | A-2009-242935 | 10/2009 |
| JP | A-2010-77499 | 4/2010 |
| JP | A-2011-58016 | 3/2011 |

OTHER PUBLICATIONS

Written Opinion of the International Searching Authority dated May 14, 2013 from International Application No. PCT/JP2013/053634.

* cited by examiner

METHOD FOR SEPARATING RHENIUM AND ARSENIC, AND METHOD FOR PURIFICATION OF RHENIUM

FIELD OF THE INVENTION

The present invention relates to a method for separating rhenium and arsenic, and a method for purification of rhenium, specifically a method for separating rhenium and arsenic and a method for purification of rhenium, the methods being capable of, in a rhenium purification process, efficiently separating rhenium and arsenic, each being contained in a nonferrous metal sulfide ore or the like, and stably recovering them.

The present application asserts priority rights based on JP Patent Application 2012-046645 filed in Japan on Mar. 2, 2012. The total contents of disclosure of the patent application of the senior filing date are to be incorporated by reference into the present application.

BACKGROUND OF THE INVENTION

Rhenium (Re) often exists mainly in molybdenite ($MoS_2$) in nature. Furthermore, molybdenite often coexists in sulfide ores, such as chalcopyrite ($CuFeS_2$), and therefore rhenium has been collected as a by-product of a smelting process of molybdenum or copper.

It has been known that these molybdenite and chalcopyrite, each containing rhenium, are difficult to be perfectly separated from each other by usual ore dressing. Therefore, there has been used a method wherein, in a pyrometallurgy process of recovering copper from chalcopyrite, molybdenite is also simultaneously fed in and melted, and in a gas scrubbing process, rhenium-containing exhaust gas volatilized is collected and rhenium is separated therefrom.

At this time, besides rhenium, a plural kinds of metals, such as arsenic, copper, zinc, and cadmium, coexist in a scrubbing liquid recovered in the gas scrubbing process, in excessive amounts compared with rhenium. As a method for recovering these metal elements from a scrubbing liquid, there has been often used a method wherein a sulfurizing agent, such as gaseous hydrogen sulfide, sodium sulfide, or sodium hydrogen sulfide, is added to the scrubbing liquid to form a precipitate of sulfide. However, in this method, rhenium is also easily precipitated as a sulfide, and therefore rhenium was not able to be selectively recovered.

Accordingly, an operation using an ion exchange method has been performed to selectively separate rhenium from a mixture of a plurality of elements. For example, Patent Literature 1 discloses a method for recovering rhenium, wherein a concentration of sulfuric acid in a liquid for scrubbing sulfurous acid gas generated from a process for smelting nonferrous metals is maintained at not less than 70 g/l, and gaseous hydrogen sulfide is blown into or soluble sulfide is added to the liquid for scrubbing sulfurous acid gas, whereby a sulfide precipitate containing rhenium is formed at an oxidation-reduction potential of 120 to 150 mV (silver/silver-chloride electrode), and then the sulfide precipitate is mixed with a copper sulfate in an acid solution to form a rhenium-containing solution, and the rhenium-containing solution obtained is made to contact a quaternary ammonium salt anion exchange material, whereby rhenium is selectively adsorbed and recovered.

In this method according to Patent Literature 1, when rhenium adsorbed to an anion exchange resin is eluted, an ammonium thiocyanide solution is used. However, there is a possibility that decomposition of ammonium thiocyanide allows formation of toxic cyanide ions. Furthermore, wastewater containing a compound in which ammonium thiocyanide is decomposed has a large environmental load, such as a higher chemical oxygen demand (COD) or a higher nitrogen concentration, and requires higher cost of chemicals necessary for treatment of the wastewater, and thus the method is not advantageous in industrial applications.

Furthermore, a process using an ion exchange method needs a comparatively larger capital investment. Therefore, there was a problem that, depending on a material to be treated, it could be difficult to carry out a design and an operation for increase manufacturing efficiency, such as optimization of equipment capacity.

Furthermore, like in the case of smelting of molybdenum or recycling of a waste catalyst containing rhenium, when a rhenium content in a raw material is comparatively high and rhenium is stably contained therein, a serious problem is not caused, but, when rhenium produced as a by-product of copper smelting is recovered, a rhenium content in a copper ore to be used as a raw material is unstable and greatly varies. Therefore, it is not easy to design and operate equipment to operate efficiently and at a low cost, and also impurity concentration is greatly influenced by a raw material, whereby separation of rhenium is difficult to be carried out stably and highly efficiently.

Therefore, for example, as Patent Literature 2 discloses, there has been recently proposed a process of separating rhenium selectively by using a precipitation separation method in combination.

The process disclosed in Patent Literature 2 is a method capable of separating rhenium stably, efficiently, and at a low cost, even if an amount of rhenium contained in a raw material greatly varies. Specifically, the method is such that rhenium is separated from a solution containing at least any one kind of elements of copper, zinc, cadmium, and arsenic, and perrhenic acid, the method comprising: a first step of adding an alkali, such as sodium hydroxide, to the solution to form a precipitate and performing solid-liquid separation of a solution containing the precipitate; a second step of adding an acid, such as sulfuric acid, to the obtained separated solution to adjust an acid concentration thereof to an equivalent concentration of not less than 1.0 N and not more than 4.0 N; and a third step of adding a sulfurizing agent, such as sodium hydrogensulfide, to the obtained adjusted solution to form a sulfide precipitate, and separating the sulfide precipitate from a post-sulfurization solution.

However, in the case of using the method according to Patent Literature 2, if arsenic is contained in a raw material of rhenium at a high concentration, there has been a problem particularly in a viewpoint of quality control of rhenium products. Arsenic is one of impurities which are difficult to be separated from rhenium, whereas the arsenic content in a rhenium product needs to be controlled to less than 1% by weight, and accordingly the arsenic content of a raw material needs to be reduced. However, arsenic in a raw material is distributed to either a leaching residue resulting after leaching rhenium or a precipitate containing arsenic generated in a purification process. Impurities, such as arsenic, contained in the leaching residue or the precipitate are chemically unstable, and therefore there was no other effective fixing methods but a method of repeatedly making the leaching residue or the precipitate undergo a pyrometallurgy process, and thereby distributing some impurities to stable slag and separating them, and thus the arsenic repeatedly having undergone the pyrometallurgy process was distributed to the raw material of rhenium again, whereby arsenic load continued to be increased.

To fix arsenic in a chemically and environmentally stable form, there is a method wherein arsenic is distributed as slag discharged from a furnace for the above-mentioned pyrometallurgy. In the slag, arsenic is in a glassy state and therefore chemically stable, which is the most preferable. However, in industrial operations, distribution of arsenic to slag is limited in a certain degree and it is not industrially easy to fix a whole amount of arsenic as slag.

On the other hand, as a method of fixing arsenic in a stable form, for example, as Patent Literature 3 discloses, there is a method wherein arsenic is transformed into iron arsenate called scorodite, which has a stable form equivalent to slag. The method according to Patent Literature 3 provides a technique by which, even if some impurity elements exist in an arsenic-containing solution, with treating the solution, there can be synthesized a scorodite compound having high crystallinity and a compact form and resisting swelling caused by moisture or the like, in other words, an iron-arsenic compound excellent in filterability. Specifically, the technique is such that an oxidizing agent is added to a solution having an arsenic concentration of not less than 15 g/L and containing arsenic ions and divalent iron ions, and then, while the solution is stirred, a precipitation reaction of an iron-arsenic compound is allowed to proceed, and the precipitation is terminated when the solution has a pH of 0 to 1.2.

However, Patent Literature 3 does not disclose a method of removing arsenic in a stable form from a raw material, such as a sulfide, containing rhenium and arsenic, while stably maintaining the quality of rhenium. Also, the method according to Patent Literature 3 is a method of leaching out high-concentration arsenic from a sulfide and forming a precipitate of iron (III) arsenate under a low-pH condition, wherein arsenic is imperfectly separated from rhenium and therefore a ratio of arsenic to rhenium (As/Re ratio) in a mother liquor after arsenic separation is higher, and accordingly an arsenic removal load in rhenium purification is very high.

Thus, there has not been proposed an industrially practicable method among a series of the methods wherein arsenic is removed as an impurity in a stable form from a raw material containing rhenium and arsenic, while the quality of rhenium is stably maintained.

PRIOR-ART DOCUMENTS

Patent Document

PTL 1: Japanese Patent Application Laid-Open No. H07-286221
PTL 2: Japanese Patent Application Laid-Open No. 2011-58016
PTL 3: Japanese Patent Application Laid-Open No. 2008-105921

SUMMARY OF THE INVENTION

The present invention is proposed in view of such actual circumstances, and aims at providing a method for separating rhenium and arsenic and a method for purification of rhenium, the methods being capable of removing arsenic as an impurity in a stable form from a raw material, such as sulfide, containing rhenium and arsenic, and an amount of arsenic circulated in a rhenium purification process is reduced thereby reducing loads, thereby stably obtaining rhenium with a low-content arsenic.

The present inventors earnestly studied to accomplish the above-mentioned aim. As a result, the inventors focused attention on a point that a leaching residue obtained by leaching a raw material containing rhenium and arsenic and a precipitate formed in a purification process each have a solubility of less than 0.1 g/l, in other words, are hard to be dissolved in water, and have a form of mixture of various arsenate, and they found that, when the leaching residue and the precipitate are made to react with an alkali to change the form of arsenic into a form in which arsenic is easily dissolved in water, and thereby arsenic is leached and recovered, while other impurities, such as copper, are fixed as a hydroxide which cannot be easily dissolved in water, whereby rhenium and arsenic can be effectively separated and a load of arsenic circulated in a rhenium purification process can be reduced.

In other words, a method of separating rhenium and arsenic according to the present invention is such that, in a rhenium purification process, a raw material containing rhenium and arsenic is oxidized and leached, and separated into a leachate containing perrhenic acid, arsenic acid, and arsenous acid and a leaching residue containing arsenate, followed by purification of rhenium from said leachate, the method comprising: a neutralization purification step of adding an alkali to the above-mentioned leachate to obtain an arsenic-containing precipitate and a rhenium-containing solution; a rhenium separation step of separating rhenium from the rhenium-containing solution obtained in the above-mentioned neutralization purification step; a precipitate decomposition step of adding an alkali to either or both the arsenic-containing precipitate obtained in the above-mentioned neutralization purification step and the leaching residue containing the above-mentioned arsenate thereby to obtain an arsenic-containing solution and a hydroxide precipitate; and an arsenic fixing step of fixing arsenic in the arsenic-containing solution obtained in the precipitate decomposition step, as a precipitate.

Here, in the above-mentioned neutralization purification step, it is preferable that, before or at the same time as an alkali is added to the above-mentioned leachate, a water-soluble divalent iron compound is added to said leachate and also an oxidizing agent is added thereto, whereby arsenic in said leachate is transformed into a precipitate of iron arsenate.

Also, it is preferable that air is used as the above-mentioned oxidizing agent and is added to the leachate by bubbling of said air.

Also, using the above-mentioned oxidizing agent, the above-mentioned leachate preferably has an oxidation-reduction potential of not less than −400 mV.

An amount of the above-mentioned water-soluble iron compound added is preferably equivalent to an amount which is such that the number of moles of trivalent iron in the above-mentioned leachate is not less than three times as much as the number of moles of pentavalent arsenic contained in said leachate.

In the above-mentioned precipitate decomposition step, when an alkali is added to the precipitate containing arsenic and/or the residue containing iron arsenate, pH is adjusted to a range of not less than 12.0 and not more than 13.3.

The alkali to be added in the above-mentioned precipitate decomposition step is preferably alkali hydroxide.

A method of purification of rhenium according to the present invention is such that a raw material containing rhenium and arsenic is oxidized and leached, and separated into a leachate containing perrhenic acid, arsenic acid, and arsenous acid and a leaching residue containing arsenate, followed by purification of rhenium from said leachate, the method comprising: a neutralization purification step of adding an alkali to the above-mentioned leachate to obtain an arsenic-containing precipitate and a rhenium-containing solution; a rhenium purification step of separating the rhenium-containing solution obtained in the above-mentioned neutralization purification step and adding a sulfurizing agent to the said solution to obtain rhenium sulfide; a precipitate decomposition step of adding an alkali to either or both the arsenic-containing precipitate obtained in the above-mentioned neutralization purification step and the above-mentioned leaching residue containing arsenate thereby to obtain an arsenic-containing solution and a hydroxide precipitate; and an arsenic fixing step of fixing arsenic in the arsenic-containing solution obtained in the precipitate decomposition step, as a precipitate.

Effects of Invention

According to the present invention, arsenic as an impurity can be removed in a stable form from a raw material, such as sulfide, containing rhenium and arsenic, and an amount of arsenic circulated in a rhenium purification process can be reduced. Thus, in the rhenium purification process, rhenium with a low-content arsenic can be stably purified.

As an amount of arsenic circulated can be reduced as mentioned above, an amount of a precipitate circulating in the rhenium purification process decreases accordingly, whereby rhenium purification can be operated with compact equipment. Furthermore, copper in a raw material can be also separated from arsenic and recovered, and therefore the transfer of the copper separated from arsenic to a copper-smelting treatment allows copper-refining to be operated with reduced arsenic-load, and copper containing less impurities to be purified.

DETAILED DESCRIPTION OF THE INVENTION

Hereinafter, a method of separating rhenium and arsenic and a method for purification of rhenium according to the present invention will be explained in detail in the following order. Note that the present invention is not limited to the following embodiment and the flowchart in FIG. 1 shows only one example, and therefore the present invention may be suitably changed unless the essentials of the present invention are changed.

1. Method of Separating Rhenium and Arsenic in Rhenium Purification Process
   1-0. Leaching step
   1-1. Neutralization purification step
   1-2. Rhenium separation step
   1-3. Precipitate decomposition step
   1-4. Arsenic fixing step
2. EXAMPLE 1. Method of Separating Rhenium and Arsenic in Rhenium Purification Process The method of separating rhenium and arsenic according to the present invention is a method of separating rhenium from arsenic in a rhenium purification process, wherein a raw material containing rhenium and arsenic is oxidized and leached, and separated into a leachate containing perrhenic acid, arsenic acid, and arsenous acid and a leaching residue containing arsenate, followed by purification of rhenium from said leachate.

Figure 1:
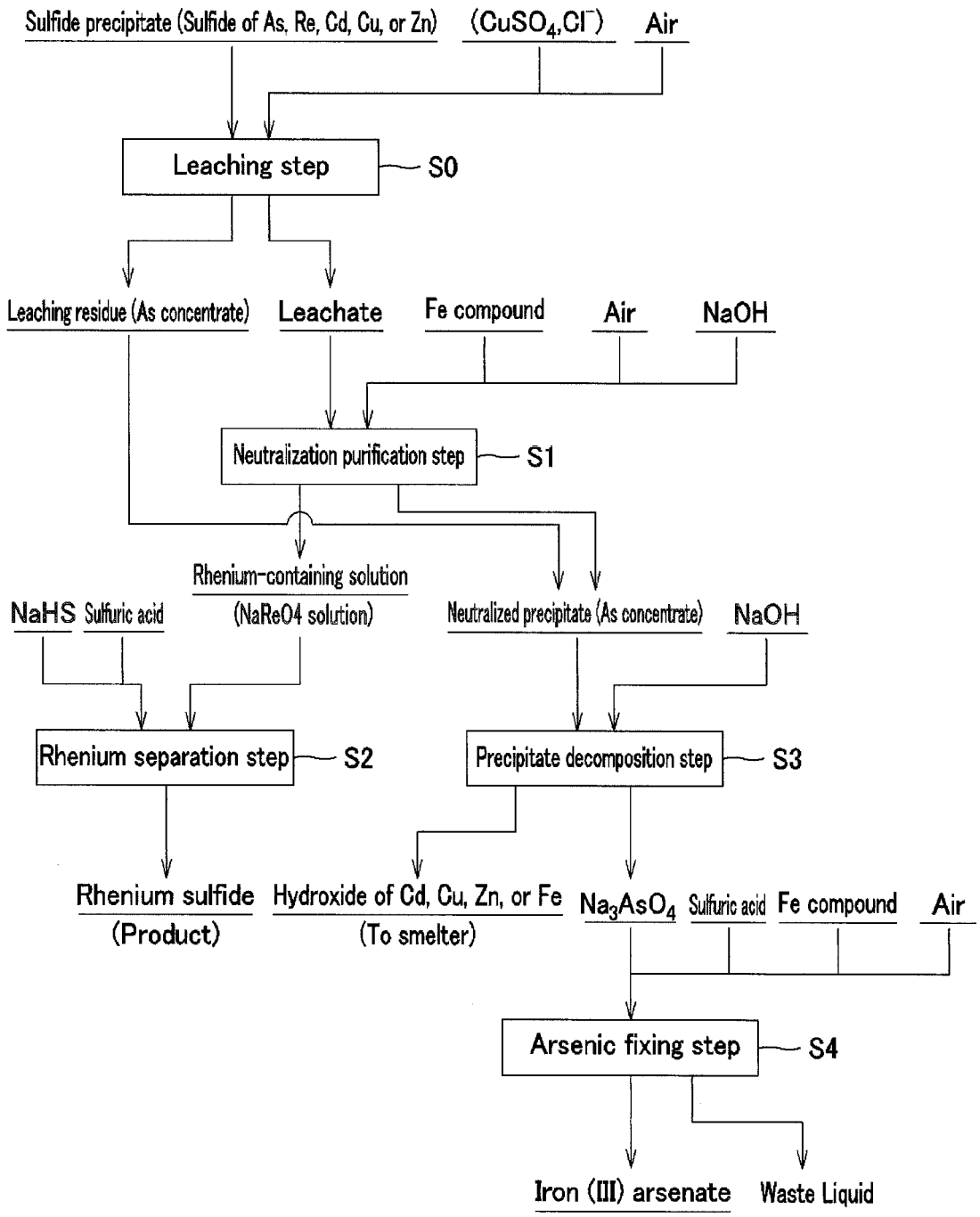
FIG. 1 is a flowchart of a method of separating rhenium and arsenic in a rhenium purification process.

Specifically, as shown in the flowchart illustrated as an example in FIG. 1, the method of separating rhenium and arsenic in the rhenium purification process comprises: a neutralization purification step S1 of adding an alkali to a leachate obtained by leaching a solid including a sulfide containing rhenium and arsenic, and thereby obtaining an arsenic-containing precipitate and a rhenium-containing solution; a rhenium separation step S2 of separating rhenium from the rhenium-containing solution obtained in the neutralization purification step S1; a precipitate decomposition step S3 of adding an alkali to either or both the arsenic-containing precipitate obtained in the neutralization purification step S1 and the leaching residue containing arsenate by the leaching, and thereby obtaining an arsenic-containing solution and a hydroxide precipitate; and an arsenic fixing step S4 of fixing arsenic in the arsenic-containing solution obtained in the precipitate decomposition step S3, as a precipitate.

According to this method of separating rhenium and arsenic, arsenic as an impurity can be removed in a stable form from a raw material containing rhenium and arsenic, and an amount of arsenic circulated in the rhenium purification process can be reduced. Thus, in the rhenium purification process, a rhenium compound with a low-content arsenic (for example, rhenium sulfide) can be stably purified.

Hereinafter, each of the steps will be explained in order. Note that, as shown in the flowchart in FIG. 1, explanation will start with a leaching step S0 of leaching a raw material containing rhenium and arsenic (leachate forming treatment).

[1-0. Leaching Step]

In the leaching step S0, there is performed a leaching treatment wherein a raw material containing rhenium and arsenic is oxidized and leached, whereby a leachate containing perrhenic acid, arsenic acid, and arsenous acid and a leaching residue including arsenate are obtained. The leachate obtained by this leaching treatment is purified through the neutralization purification step S1 mentioned later to become a solution for rhenium purification.

Examples of the raw material containing rhenium and arsenic include a sulfide which contains, besides rhenium and arsenic, other elements and is hard to dissolve in water. This sulfide is contained in a solid material, for example, ores, such as molybdenite. Therefore, in this leaching treatment, a solid material, such as ores, is used as a material to be treated, and a sulfide containing rhenium and arsenic mainly included in the solid material is oxidized as mentioned later and thereby leached.

Note that the above-mentioned ores as a raw material containing rhenium and arsenic contain, besides rhenium and arsenic, elements, such as copper, zinc, and cadmium. Hereinafter, there will be explained an example of using these ores which are to be raw materials in nonferrous-metal smelting, as a raw material.

In the leaching treatment of the leaching step S0, a raw material, such as a sulfide containing rhenium and arsenic, is oxidized in water, whereby, for example, according to the following formulas (1) and (2), rhenium and arsenic are leached from the raw material, that is the sulfide, as to form a leachate containing perrhenic acid, arsenic acid, and arsenous acid, and a leaching residue containing arsenate as mentioned later.

$$2Re_2S_7+7O_2+2H_2O \rightarrow 4HReO_4+14S \quad (1)$$

$$2As_2S_3+5O_2+6H_2O \rightarrow 4H_3AsO_4+6S \quad (2)$$

As an oxidizing agent to be used in the oxidation of the raw material, such as sulfide, a material which has no impact on downstream steps is preferable, and, for example, air, oxygen, hydrogen peroxide, or the like may be used. Among these, air is more preferably used, from the economic standpoint.

In the above-mentioned leaching treatment, it has been known that, without any treatment, the reaction in the above-mentioned formula (2) is slow in speed. Therefore, it is preferable that copper (II) ions (for example, copper (II) sulfate) are made to coexist at the time of oxidation leaching and oxidization is performed through a cation exchange reaction for a sulfide according to the following formula (3) (See the following formula (4).). Furthermore, chloride ions also may be made to coexist in the leaching treatment. In this way, oxidation-reduction catalytic action between copper (II) and copper (I) ions can be used, and thus the raw material containing rhenium and arsenic can be leached more quickly.

$$As_2S_3+3CuSO_4+3H_2O \rightarrow As_2O_3+3CuS+3H_2SO_4 \quad (3)$$

$$As_2O_3+O_2+3H_2O \rightarrow 2H_3AsO_4 \quad (4)$$

Note that the solution at the time of the leaching according to the above-mentioned formulas is weakly acidic. Therefore, for example, when cations which coexist with arsenic acid formed according to the above-mentioned formula (2) or (4) are copper (II) ions (copper(II) sulfate), the arsenic acid is transformed into arsenate, such as copper (II) hydrogen arsenate, according to the following formula (5), and becomes a residue. However, this reaction is a reversible reaction under an acidic condition, and therefore a part of arsenic acid remains in a mother liquor as it is.

$$H_3AsO_4+CuSO_4 \rightarrow CuHAsO_4+H_2SO_4 \quad (5)$$

Thus, such leaching of a raw material containing rhenium and arsenic allows a leachate containing perrhenic acid, arsenic acid, and arsenous acid (hereinafter, referred to as a "rhenium leachate" or simply a "leachate") and a leaching residue including arsenate, such as copper (II) hydrogen arsenate, to be obtained. Note that elements, such as copper, zinc, and cadmium, which are contained in an ore used as a material to be leached, are also contained in the rhenium leachate to be obtained.

[1-1. Neutralization Purification Step]

In the neutralization purification step S1, an alkali is added to the rhenium leachate obtained by leaching a raw material containing rhenium and arsenic to perform neutralization purification, whereby a neutralized precipitate containing arsenic (arsenate) and a solution containing rhenium (rhenium-containing solution) are obtained. Note that, hereinafter, a solution obtained by neutralizing and purifying the rhenium leachate will be referred to as a neutralized and purified solution. This neutralized and purified solution is solid-liquid separated, whereby the neutralized precipitate including arsenate and the rhenium-containing solution can be separated and recovered.

The rhenium leachate obtained by the above-mentioned leaching treatment is weakly acidic. Therefore, in the neutralization purification step S1, an alkali is added to the rhenium leachate thereby to neutralize said rhenium leachate. Thus neutralization of the leachate allows arsenic acid remaining in the rhenium leachate to react with other remaining cations and thereby to be fixed as an arsenate, as shown in the following formula (6), for example. Note that the following formula (6) represents a reaction example wherein arsenic is fixed as a copper arsenate by copper which is contained in a raw material ore (sulfide) and leached in the rhenium leachate together with rhenium and arsenic.

$$2H_3AsO_4+3CuSO_4+6NaOH \rightarrow Cu_3(AsO_4)_2+3Na_2SO_4+6H_2O \quad (6)$$

In view of cost, handling easiness, side reaction occurrence, and the like, a sodium hydroxide solution is preferably used as the alkali as a neutralizing agent.

Here, in the neutralization purification step, it is preferable that, before or at the same time as an alkali is added to the rhenium leachate, a water-soluble divalent iron compound is added to said rhenium leachate and also an oxidizing agent is added thereto, whereby arsenic in the leachate is fixed as a precipitate of iron arsenate. Iron arsenate is in a stable form. Therefore, arsenic, which is an impurity in the rhenium purification, is fixed as an iron arsenate having a stable form, whereby arsenic can be effectively separated from rhenium, and an amount of arsenic contained in a rhenium-containing solution used for the rhenium purification can be reduced.

As the water-soluble iron compound to be added and used as an iron source, there is preferably a water-soluble divalent iron compound, which is oxidized by an oxidizing agent to be in a trivalent state. Specifically, examples of the water-soluble iron compound include ferrous sulfate, ferrous chloride, ferrous bromide, and ferrous nitrate, but ferrous sulfate and ferrous chloride, which are inexpensive and readily available, are particularly preferable.

As the oxidizing agent, a material which has no impact on downstream steps is preferable, and, for example, air, oxygen, hydrogen peroxide, or the like may be used. Among these, air is more preferably used, from the economic standpoint. For example, air as an oxidizing agent is added to a rhenium leachate by bubbling the air. As mentioned above, the oxidizing agent allows iron in a water-soluble iron compound added in a rhenium leachate to be oxidized to trivalent iron, and also allows arsenic contained in the rhenium leachate to be oxidized to pentavalent arsenic, and the trivalent iron reacts with the pentavalent arsenic to form a precipitate of iron arsenate.

The above-mentioned oxidation by the oxidizing agent is preferably carried out until the oxidation reduction potential (ORP) of a rhenium leachate (on a silver/silver-chloride electrode basis) reaches not less than −400 mV. When the oxidization is performed until the ORP reaches not less than −400 mV, the added iron can be sufficiently oxidized to trivalent iron and also the arsenic in the leachate can be sufficiently oxidized to pentavalent arsenic, whereby formation of a precipitate of iron arsenate can effectively proceed. Thus, an arsenic content in a solution (rhenium-containing solution) obtained by separating the precipitate from the neutralized and purified solution formed in the neutralization purification step S1 can be reduced more effectively.

Furthermore, an amount of the water-soluble iron compound added as an iron source is preferably equivalent to an amount which is such that, in a state where arsenic and iron in a leachate are oxidized to pentavalent arsenic and trivalent iron, respectively, the number of moles of the trivalent iron in the leachate is not less than three times as much as the number of moles of the pentavalent arsenic contained in the leachate (Fe/As≥3). Thus, formation of a precipitate of iron arsenate can effectively proceed, and an arsenic concentration in a rhenium-containing solution can be reduced more effectively.

Note that, also in the case where the neutralization purification treatment is performed by adding the water-soluble iron compound to the rhenium leachate as mentioned above, the arsenate which is a precipitate obtained by this neutralization purification treatment is not limited to iron arsenate. In other words, besides iron arsenate, arsenate of copper, zinc, cadmium, and the like, which are contained in a raw material and contained in a rhenium leachate by leaching treatment are included as examples of the arsenate which is formed as a precipitate. As for the arsenate other than iron arsenate, it is presumed that the precipitate thereof is formed under a condition of pH of 8 to 10 in the neutralization purification treatment, and therefore, different from the leaching residue formed by the leaching treatment shown in the above-mentioned formula (5), copper (II) arsenate is mainly formed as arsenate other than iron arsenate.

[1-2. Rhenium Separation Step]

At the rhenium separation step S2, rhenium is separated from the solution containing rhenium and obtained at the neutralization purification step S1 (rhenium-containing solution). In other words, at this rhenium separation step S2, rhenium in the rhenium-containing solution is, for example, transformed into rhenium sulfide or the like, thereby being purified.

The separation method of separating rhenium in the rhenium separation step S2 is not particularly limited, but, for example, there may be used a method in which a sulfurizing agent is added to a rhenium-containing solution to perform sulfurization treatment, and rhenium is transformed into rhenium sulfide, whereby rhenium is separated and recovered.

More specifically, in the method of separating and recovering rhenium by the sulfurization treatment, an acid is preferably made to coexist in order to obtain a rhenium sulfide quantitatively with respect to the sulfurizing agent to be added. The reason for this is considered that perrhenic acid ions in a rhenium-containing solution are in an anionic form, and accordingly the perrhenic acid ions need to be first transformed to be in a cationic form in order to form a precipitate by rhenium sulfurization.

When rhenium is separated by the sulfurization treatment, acid needs to be newly added and thereby made to coexist in the sulfurization treatment since the neutralization treatment is performed in the neutralization purification step S1 as mentioned above. As the acid to be added, an acid which is strongly acidic and non-oxidizing not to decompose sulfide is preferably used so that perrhenic acid can be stably present. For example, acid, such as sulfuric acid and hydrochloric acid, may be used, but, in view of cost, corrosiveness of apparatus material, or volatility, sulfuric acid is preferably used. Also, an amount of acid added is preferably such that the concentration of the acid is an equivalent concentration of not less than 1.0 N and not more than 4.0 N, more preferably not less than 2.0 N and not more than 3.0 N in a rhenium-containing solution.

In the sulfurization treatment, a sulfurizing agent is added to a solution (preparation solution) obtained by adding an acid to a rhenium-containing solution, whereby rhenium is precipitated as a sulfide. As the sulfurizing agent to be added, for example, gaseous hydrogen sulfide, sulfide of alkali metals or alkaline earth metals, water-soluble sulfide, such as hydrogen sulfide salt or the like, may be used. Particularly, in view of cost and handling easiness, sodium hydrogen sulfide or sodium sulfide is preferably used.

A precipitate of the formed rhenium sulfide can be separated by solid-liquid separation treatment, such as filtration or centrifugal separation.

Thus, at the rhenium separation step S2, rhenium can be separated from a rhenium-containing solution and purified. In the above-mentioned neutralization purification step S1, arsenic, which is an impurity in rhenium purification, is effectively separated, and furthermore, also in the below-mentioned precipitate decomposition step S3 and the subsequent arsenic fixing step S4, arsenic is securely fixed in a stable form and separated, and therefore arsenic load in the rhenium purification process can be effectively reduced and an arsenic content in the purified rhenium can be reduced, whereby rhenium having high quality can be separated and purified.

[1-3. Precipitate Decomposition Step]

In the precipitate decomposition step S3, an alkali is added to either or both the arsenic-containing neutralized precipitate (arsenate) obtained in the neutralization purification step S1 and the arsenate-containing leaching residue obtained by the leaching treatment, whereby an arsenic-containing solution and a hydroxide precipitate are obtained.

Here, in the above-mentioned leaching treatment of a raw material containing rhenium and arsenic and in the neutralization purification treatment for a rhenium leachate obtained by said leaching treatment, conventionally, arsenate each precipitated and separated according to the above-mentioned formula (5) or (6) repeatedly undergoes a smelting process, whereby copper contained in the arsenate is separated as a product. On the other hand, much of arsenic volatilizes by heating in the smelting process and is collected into washing water in a scrubbing tower for exhaust gas, and the scrubbing liquid is fixed as a sulfide again together with rhenium in a waste-liquid-treatment step. As a result, much of arsenic separated once is mixed in the rhenium purification process again, thereby causing an increase in load in the rhenium purification.

The present inventors focused attention on a point that arsenate (having copper (II) hydrogen arsenate as a main component) which is a leaching residue obtained by leaching a raw material containing rhenium and arsenic and a precipitate of arsenate (having copper (II) arsenate or iron (III) arsenate as a main component) formed in the above-mentioned neutralization purification step S1 each have a solubility of less than 0.1 g/l and are in a form of mixture hard to be dissolved in water. Also, the inventors found that, when the precipitates of the arsenate are made to react with an alkali to change the form into a form in which arsenic is easily dissolved in water, arsenic is leached and recovered, while, when other impurities, such as copper, are fixed as a hydroxide which can not be dissolved in water easily, the arsenic load in the rhenium purification process can be reduced.

In the method of separating rhenium and arsenic according to the present embodiment, in the precipitate decomposition step S3, an alkali is added to either or both the arsenic-containing neutralized precipitate obtained in the neutralization purification step S1 and the arsenate-containing leaching residue obtained by the above-mentioned leaching treatment. Thus, these precipitates are decomposed and arsenic in the precipitates are leached, whereby a solution containing arsenic is obtained and also other elements, such as copper, are precipitated as hydroxides.

Thus, the decomposition of the precipitates allows arsenic to be effectively separated from the precipitates of arsenate obtained by the leaching treatment and the neutralization purification treatment. In other words, arsenic can be separated and diverted from the rhenium purification process. In this way, arsenic load in the rhenium purification process can be reduced, and arsenic can be prevented from precipitating together with rhenium at the above-mentioned rhenium separation step S2.

As the method of decomposing arsenate in the precipitate decomposition step S3, for example, a double decomposition method by alkali as shown in the following formula (7) or (8) may be used. Hydroxide has usually a lower solubility than metallic arsenate, and therefore, by adding an alkali arsenate, a reaction shown in the formula (7) or (8) proceeds rightward.

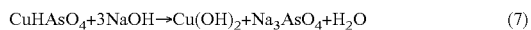   (7)

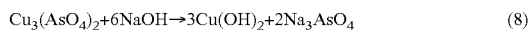   (8)

As the alkali to be added, alkali hydroxide, such as sodium hydroxide or potassium hydroxide, may be used, and from the economic standpoint, sodium hydroxide is preferably used. Also, depending on a type of arsenate, alkali carbonate may be sometimes used in substitution for alkali hydroxide, but, in many cases, carbonate has a higher solubility than metallic hydroxide, and therefore alkali carbonate tends to have a lower reaction rate than alkali hydroxide.

An amount of alkali added is preferably greater than a theoretically calculated amount. A higher pH accelerates a decomposition reaction, and thus, addition of an alkali in an amount greater than a theoretically calculated amount allows a concentration of hydroxide to be reduced in accordance with the principle of solubility product. Depending on the kind of arsenate, a pH of not less than 12 makes decomposition of a precipitate thereof proceed more effectively, while a pH of approximately more than 14 allows many of metal hydroxides to become hydroxo complexes and dissolve. Moreover, in a higher pH range, it is hard to industrially control an amount of alkali added, and therefore a pH of not more than 13.3 is preferable. Note that, even if pH is increased until exceeding 14, sometimes arsenate can not be fully decomposed, but, when an amount of arsenic circulated through the whole smelting process decreases, arsenic loads in the rhenium separation step S2 are gradually reduced, whereby a quality of rhenium can be maintained.

Thus, an alkali is added to a neutralization precipitate (arsenate) containing arsenic and obtained in the neutralization purification step S1 and/or a leaching residue containing arsenate and obtained by the above-mentioned leaching treatment, whereby the neutralization precipitate and the leaching residue precipitate can be decomposed and arsenic contained in the precipitates can be leached in a solution, and thus only arsenic can be effectively separated and removed. Furthermore, a precipitate of hydroxide which is formed while arsenic is leached by such precipitate decomposition is a hydroxide precipitate of copper or the like contained in a raw material, and therefore transfer of this hydroxide precipitate to copper-refining treatment allows copper and the like, having a less amount of arsenic contained as an impurity, to be effectively purified.

[1-4. Arsenic Fixing Step]

In the arsenic fixing step S4, from the arsenic-containing solution obtained in the precipitate decomposition step S3, in other words, an arsenic-containing solution (for example, a sodium arsenate solution) which is obtained by decomposing arsenate having a low degree of solubility in water with alkali and separating a hydroxide precipitate, in accordance with a well-known method, arsenic in said arsenic-containing solution is fixed as a solid (precipitate) and separated.

A method of fixing arsenic is not particularly limited, but a well-known method may be used. Examples of the method of fixing arsenic include a method of fixing arsenic as a crystal of diarsenic trioxide by reduction with sulfur dioxide or the like, and a method of recovering arsenic as a precipitate of calcium arsenate or iron (III) arsenate, each having a low degree of solubility in water, by adding calcium ions and iron ions. Among these, a crystal of arsenic trioxide and calcium arsenate can be used for industrial chemicals, agricultural chemicals, and the like, but, in view of stable separation and removal of arsenic, it is preferably to separate and fix arsenic as iron (III) arsenate having a low degree of solubility in water and being in a stable form. Also in view of storage, it is preferably to fix arsenic as iron (III) arsenate being in a stable form. Therefore, hereinafter, an example of a method of separating and fixing arsenic as iron (III) arsenate will be explained.

Specifically, the method of fixing arsenic as iron (III) arsenate is such that a water-soluble iron compound and an acid are added to an arsenic-containing solution to transform arsenic in the solution into a precipitate of iron (III) arsenate. As the water-soluble iron compound to be added, any one of a water-soluble iron (II) salt containing divalent iron and a water-soluble iron (III) salt containing trivalent iron may be added, but in the case of adding a water-soluble iron (II) salt, the salt needs to be oxidized by an oxidizing agent. Also, in the case of using the former-mentioned water-soluble iron (II) salt, there is an advantage of being able to use an iron (II) salt, which is inexpensive, while there is a problem that the oxidation reaction rate of iron (II) ions is low. On the other hand, in the case of using the latter-mentioned water-soluble iron (III) salt, an oxidation reaction is not required and accordingly the reaction rate of forming iron (III) arsenate is higher, whereby efficient treatment is achieved. Note that an iron (III) compound has a problem of being expensive, but, for example, the use of a basic iron (III) compound or the like, which is often produced at a smelting process, allows efficient fixing of arsenic.

It has been known that a form of a salt to be formed (precipitate) is different depending on an abundance ratio of metal ions to arsenic. Specifically, in the case where an abundance ratio is 0.5 mol of divalent metal ions, such as iron, with respect to 1 mol of arsenic, a dihydrogen arsenate salt $M(H_2AsO_4)_2$ is formed. Also, in the case where an abundance ratio of divalent metal ions with respect to arsenic is more than 0.5 mol and less than 1.0 mol, a dihydrogen arsenate salt and a monohydrogen arsenate salt $MHAsO_4$ are formed. Furthermore, in the case where the abundance ratio is 1.0 mol, only a monohydrogen arsenate salt is formed, and in the case where the abundance ratio is more than 1.0 mol and less than 1.5 mol, a monohydrogen arsenate salt and an arsenate $M_3(AsO_4)_2$ are formed. Furthermore, in the case where the abundance ratio is not less than 1.5 mol, only an arsenate is formed. Note that M in the above-mentioned composition formulas of the arsenic compounds represents a divalent metal.

Among the above-mentioned arsenic compounds, only a monohydrogen arsenate salt and an arsenate have a low degree of solubility in water. Therefore, in the case where arsenic is present, when metal ions to form salts with arsenic acid are divalent, the metal ions need to be added so that a molar ratio (M/As) of divalent metal ions (M) to arsenic is not less than 1. Also, for example, iron ions finally become trivalent, and therefore the iron ions need to be added so that a molar ratio (Fe/As) of iron ions to arsenic is not less than 2/3.

As an acid to be added to an arsenic-containing solution, for example, sulfuric acid, hydrochloric acid, or the like may be used. An acid is thus added to an arsenic-containing solution, thereby making the solution have a pH of not more than 2.0. The solution having a pH of not more than 2.0 allows a precipitate of iron (III) arsenate to be effectively formed.

In the case where a water-soluble iron (II) salt is used as a water-soluble iron compound to be added, an oxidizing agent for oxidizing iron to trivalent iron is added. Examples of the oxidizing agent to be used include air, oxygen, and hydrogen peroxide. Among these, air is preferably used, from the economic standpoint. For example, air as an oxidizing agent is added, by bubbling the air, into a solution to which a water-soluble iron compound is added. This oxidizing agent allows iron in the water-soluble iron compound to be oxidized to trivalent iron, and the trivalent iron reacts with pentavalent arsenic in the arsenic-containing solution to form a precipitate of iron (III) arsenate.

As explained in detail above, in the method of separating rhenium and arsenic according to the present embodiment, a neutralization purification treatment is performed to separate rhenium and arsenic from a leachate obtained by leaching a raw material, and also a precipitate decomposition treatment is performed to decompose a neutralized precipitate obtained by the neutralization purification treatment and a leaching residue obtained by leaching the raw material. This decomposition of the neutralized precipitate and the leaching residue allows also arsenic contained in the precipitates to be separated from copper and the like other than arsenic. Thus, also when the neutralized precipitate and the leaching residue are circulated in the rhenium purification process, an amount of arsenic circulated can be reduced, and an arsenic content in rhenium to be purified can be effectively reduced.

As an amount of arsenic circulated can be reduced as mentioned above, an amount of a precipitate circulated in the rhenium purification process decreases accordingly, and thus rhenium purification can be operated with compact equipment. Furthermore, copper in a raw material also can be separated from arsenic and recovered, and therefore the transfer of copper separated from arsenic to copper-smelting treatment allows copper-refining to be operated with reduced arsenic loads, and copper containing less impurities to be purified.

2. Example

Hereinafter, an example according to the present invention will be described, but the present invention is not limited to the following example.

Example

<Arsenic Separation Treatment in Rhenium Purification Process>

A treatment for separating arsenic in rhenium purification process was performed as mentioned below.

(1) Leaching Treatment 300 g (wet-g) of a sulfide mixture having a rhenium content of 2.3% and a arsenic content of 24.4% and having a moisture percentage of 56% was suspended in 3000 ml of a solution obtained by adding copper sulfate pentahydrate to have a Cu concentration of 30 g/l and containing 35.5 g/l of Cl as a hydrochloric acid, and then was maintained at 80 degrees C. Using sinter glass, air is blown into this solution until the oxidation reduction potential (ORP) of the solution reaches the maximum (580 mV in the case of using a silver/silver-chloride electrode as a reference electrode), thereby performing leaching, and then a slurry obtained by the leaching was filtered to perform solid liquid separation. A residue obtained by the solid liquid separation was washed using 300 ml of pure water.

(2) Neutralization Purification Treatment

Next, to a leachate obtained by the leaching treatment, a sodium hydroxide having a concentration of 8 mol/l was added until pH reached 10 at 25 degrees C., thereby performing a neutralization purification treatment, and a precipitate obtained by the treatment (neutralized precipitate) was solid-liquid separated and recovered.

Here, Table 1 below shows the respective compositions of the leaching residue obtained by the above-mentioned leaching treatment and the neutralized precipitate obtained by neutralizing and purifying the leachate. The leaching residue and the neutralized precipitate were used as raw materials for arsenic recovery.

TABLE 1

| Composition of Arsenic-containing Material (dry-%) | | | | | |
|---|---|---|---|---|---|
| (Raw Material) | | | | | |
|  | As | Re | Cu | Fe | S |
| Leaching Residue | 6.2 | 0.45 | 13 | 0.16 | 31 |
| Neutralized Precipitate | 4.3 | <0.1 | 5.1 | 10 | 8.7 |

(3) Precipitate Decomposition Treatment (Arsenic Leaching Treatment)

Next, 50 g (wet-g) aliquots each of the leaching residue and the neutralization precipitate, each having a respective composition shown in the above-mentioned Table 1, were taken and suspended in 500 ml of water while a temperature of 25 degrees C. was maintained. A sodium hydroxide solution having a concentration of 8 mol/l was added to this slurry to adjust the pH of the solution to 13.3, whereby decomposition treatment (arsenic leaching treatment) for these precipitates was performed. Table 2 below shows the respective compositions of leaching residues (hydroxide precipitates) each obtained after decomposing the leaching residue and the neutralized precipitate.

TABLE 2

| Composition of Alkali-leaching Residue (dry-%) | | | | | |
|---|---|---|---|---|---|
| (After Leaching of As) | | | | | |
|  | As | Re | Cu | Fe | S |
| Leaching Residue | 2.3 | <0.1 | 16 | 0.22 | 30 |
| Neutralized Precipitate | 3.2 | <0.1 | 12 | 25 | <0.1 |

As shown in Table 2, when the leaching residue obtained by the above-mentioned leaching treatment (1) was decomposed, an arsenic leaching rate was 70%, while when the neutralized precipitate obtained by the above-mentioned neutralization purification treatment (2) was decomposed, an arsenic leaching rate was 68%, and hence it was found that this precipitate decomposition treatment was capable of leaching arsenic contained in the precipitates at a high leaching rate. Also, it was found that rhenium which remained in precipitates of the leaching residue and the neutralization precipitate was also simultaneously leached. Note that the arsenic leaching rate was calculated by (weight of As leaching residue×As content)/(weight of raw material used for leaching×As content)×100(%).

(4) Arsenic Fixing Treatment

Next, solutions (arsenic leachate) obtained by recovering in the above-mentioned precipitate decomposition treatment (3) each were adjusted by adding water so as to have an arsenic concentration of 1 g/l in the corresponding leachate, and then 600 ml of the respective solutions were taken. A sulfuric acid having a concentration of 60% was added to thereto to adjust the pH to 11.8, and 4.8 g of ferrous sulfate (heptahydrate) was added thereto, then, air was blown thereinto while a temperature of 80 degrees C. was maintained, whereby the solution was oxidized until the oxidation-reduction potential thereof reached approximately 400 mV to form a precipitate. An amount of the precipitate obtained from the leaching residue in the above-mentioned (1) and an amount of the precipitate obtained from the neutralized precipitate in the above-mentioned (2), each obtained by this arsenic fixing reaction, were 0.70 g and 0.81 g, respectively.

The obtained precipitates each were washed by water, and then the solubility thereof in pure water was investigated. As a result, it was confirmed that the precipitates each had a solubility of less than 0.05 mg/l, and, as a result of identification with X-ray diffractometer, the precipitates each were in a form of iron (III) arsenate (dihydrate salt).

It was found that, as mentioned above, the decomposition treatment (leaching treatment) by alkali of the leaching residue obtained by leaching a raw material, such as sulfide containing rhenium and arsenic, and the neutralized precipitate obtained by neutralizing and purifying a leachate resulting from said leaching allows arsenic, which is an impurity in the rhenium purification process, to be effectively leached and to be separated and recovered as an iron arsenate. Thus, arsenic contained in the above-mentioned leaching residue and the above-mentioned neutralized precipitate can be prevented from being circulated through the rhenium purification process again, and an amount of arsenic contained, as an impurity, in rhenium to be purified can be effectively reduced, whereby rhenium having a high quality can be purified.

<Relationship Between pH and Arsenic Leaching Rate in Precipitate Decomposition Treatment>

Next, there was investigated a relationship between pH of the leaching residue and/or the neutralized precipitate slurry and a concentration of arsenic in the obtained leachate (arsenic-containing solution) in the above-mentioned precipitate decomposition treatment (3).

Specifically, 50 g (wet-g) aliquots each of the leaching residues, whose compositions were shown in Table 1 above, were taken and suspended in 500 ml of water while a temperature of 25 degrees C. was maintained. A sodium hydroxide solution was added to each of slurry to adjust the pH of the respective solution obtained to 9, 10, 11, 12, 13, or 13.3, whereby decomposition treatment (arsenic leaching treatment) of the precipitates (leaching residues) was performed. At the time when the pH of the solution was stabilized, a small amount of the slurry was sampled, and repeatedly filtered.

Figure 2:
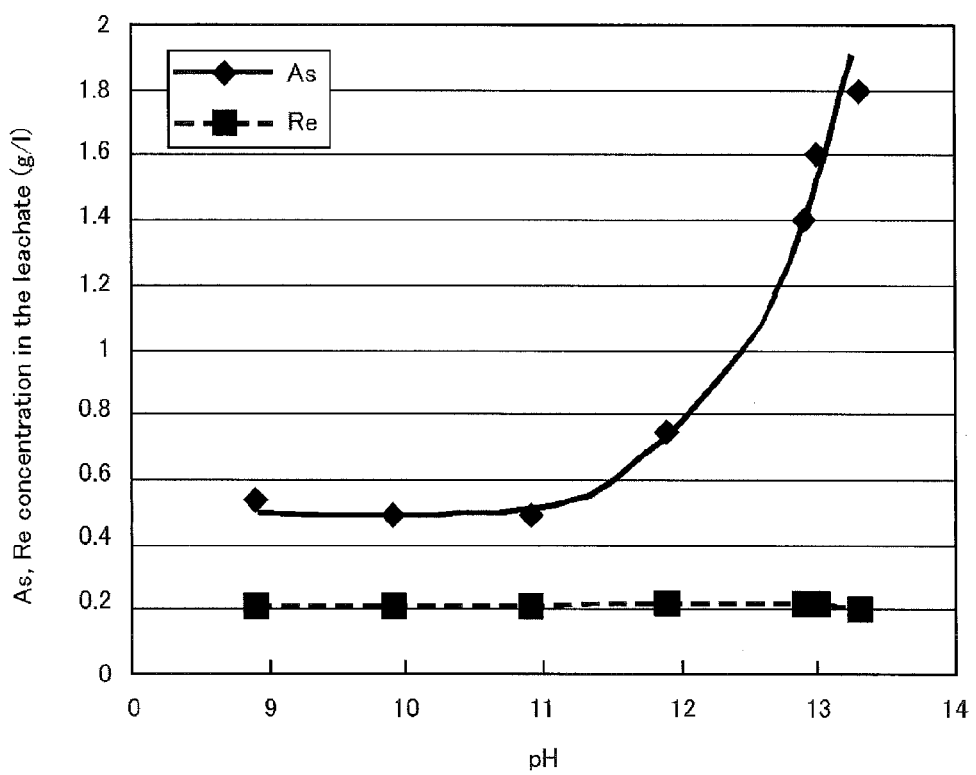
FIG. 2 is a chart illustrating the respective relationships between pH of a leaching residue and/or a neutralized precipitate slurry in precipitate decomposition treatment and a concentration of As or Re concentration in an obtained leachate (arsenic-containing solution).

FIG. 2 is a graph showing investigation results and illustrating the respective relationships between pH of the leaching residue and/or the neutralized precipitate slurry in the precipitate decomposition treatment and a concentration of As or Re eluted in an obtained leachate (arsenic-containing solution). Note that, in FIG. 2, an arsenic concentration of 1 g/l in a leachate is equivalent to an arsenic leaching rate of 38%.

FIG. 2 suggests that, for example, to obtain a leaching rate of not less than 30%, which is considered industrially significant, a pH of not less than 12 needs to be maintained. Furthermore, it was observed that a pH of more than 13.3 caused the elution of copper. It was thus found that a pH of not more than 13.3 was preferable.

<Study in Neutralization Purification Treatment>

Test Example 1

As a sulfate, ferrous sulfate, which is a water-soluble iron compound, was added to a perrhenic acid solution having an arsenic concentration of 18.5 g/l and containing 2.1 g/l of rhenium so that a molar concentration ratio (Fe/As) of trivalent iron to pentavalent arsenic in a solution later obtained by air bubbling was adjusted to 3, and then a sodium hydroxide solution having a concentration of 8 mol/l was added thereto to adjust pH to 9. Air is blown into this solution at 2.0 liter/min to perform bubbling until the oxidation reduction potential (ORP) of the solution reaches a measurement value of not less than 0 mV, the value being measured using a silver/silver-chloride electrode as a reference electrode, and then the solution was filtered to separate filtrate from a precipitate.

From analytical values of the thus-obtained filtrate (neutralized filtrate) and the thus-obtained precipitate (neutralized precipitate), a precipitation rate of arsenic (arsenic removal rate) was measured.

The result showed that the precipitation rate of arsenic was not less than 99.97%. Furthermore, in the case where a sulfurizing agent was added to this solution, from which arsenic was removed, thereby to obtain rhenium sulfide, an arsenic content in the rhenium sulfide was less than 1.0%, and thus rhenium having extremely less impurity was able to be purified.

Figure 3:
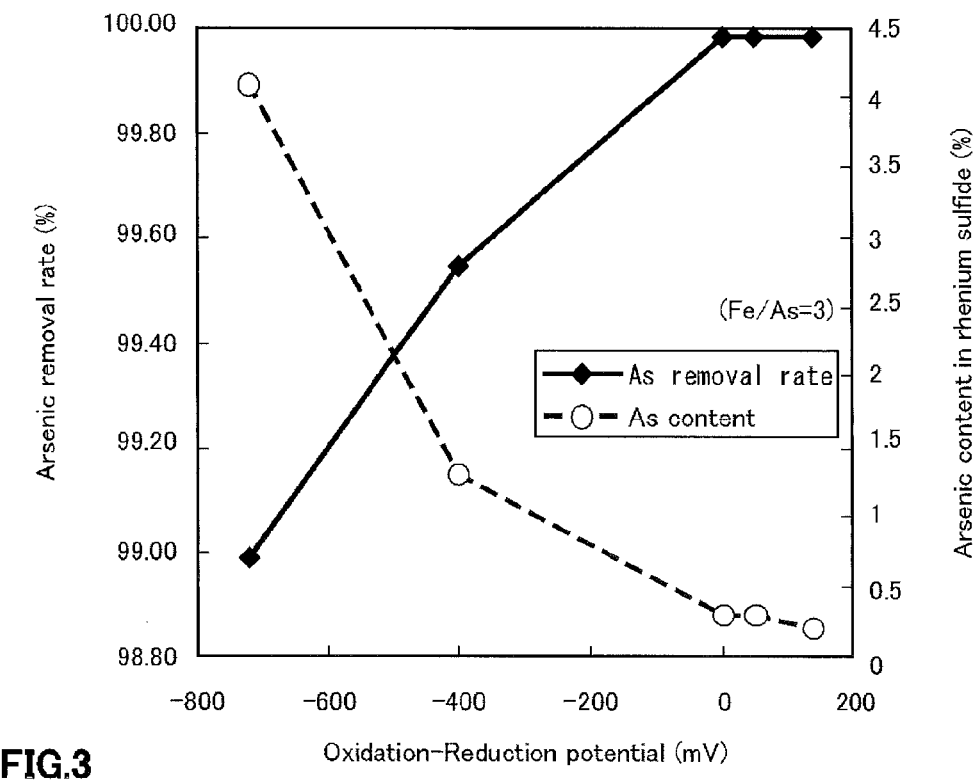
FIG. 3 is a chart illustrating the respective relationships of an arsenic removal rate and an arsenic content in purified rhenium sulfide each with respect to ORP at the time when a leachate is oxidized by an oxidizing agent so as to have an ORP of not less than 0 mV.

FIG. 3 is a graph illustrating the respective relationships of an arsenic removal rate and an arsenic content in purified rhenium sulfide each with respect to ORP at the time when a solution is oxidized by air bubbling so that the ORP is not less than 0 mV. As shown in this graph of FIG. 3, it was found that, when a solution is oxidized so that the ORP is not less than 0 mV, an arsenic removal rate is effectively improved, and when the solution is oxidized so that the ORP is not less than −400 mV, a high arsenic-removal rate of not less than 99.20% is achieved, and furthermore, when the solution is oxidized so that the ORP is not less than 0 mV, an extremely-high arsenic-removal rate of not less than 99.97% is achieved.

Test Example 2

An arsenic precipitate rate in the neutralization purification treatment was investigated in the same manner as in Test Example 1, except that, in said treatment, ferrous sulfate was added so that a molar concentration ratio (Fe/As) of iron to arsenic was adjusted to 10. Note that this molar concentration ratio of iron to arsenic is a molar concentration ratio of iron to arsenic, the iron being oxidized to trivalent iron and the arsenic being oxidized to pentavalent arsenic by air bubbling.

As a result, an arsenic precipitate rate and an arsenic content in rhenium sulfide obtained from a solution after precipitate removal were equivalent to those in Test Example 1, and thus arsenic was effectively removed and rhenium having a high quality was purified.

Figure 4:
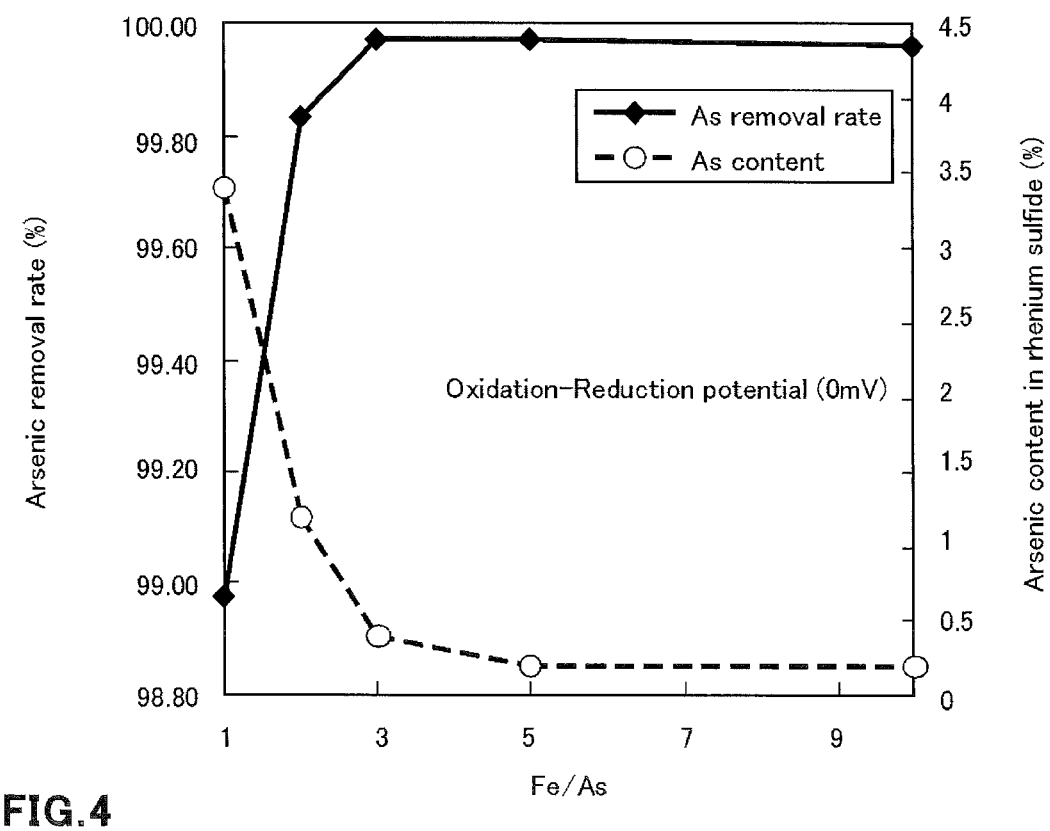
FIG. 4 is a chart illustrating the respective relationships between a molar concentration ratio represented by Fe/As in a leachate and an arsenic removal rate or an arsenic content in a purified rhenium sulfide.

FIG. 4 is a chart illustrating the respective relationships of an arsenic removal rate and an arsenic content in a purified rhenium sulfide each with respect to a molar concentration ratio (Fe/As) at the time when the molar concentration ratio is adjusted to 1, 2, 3, 5, or 10 by addition of ferrous sulfate, a water-soluble iron compound. Note that this molar concentration ratio of iron to arsenic is also a molar concentration ratio of iron to arsenic, the iron being oxidized to trivalent iron and the arsenic being oxidized to pentavalent arsenic by air bubbling, as mentioned above. Also, ORP of the solution by air bubbling was set to 0 mV.

As shown in this graph of FIG. 4, it was found that, when a water-soluble iron compound is added so that Fe/As is not less than 3, a high arsenic-removal rate of not less than 99.00% is achieved, and furthermore, when Fe/As is not less than 5, an extremely-high arsenic-removal rate of not less than 99.80% is achieved.

Test Example 3

An arsenic precipitate rate in the neutralization purification treatment was investigated in the same manner as in Test Example 1, except that, in said treatment, neither addition of ferrous sulfate nor air bubbling was carried out.

As a result, the arsenic precipitate rate remained at 98.30% even at the maximum, and an arsenic content in the manufactured rhenium sulfide remained high, that is, 5.3%.

Test Example 4

An arsenic precipitate rate in the neutralization purification treatment was investigated in the same manner as in Test Example 1, except that, in said treatment, ferrous sulfate was added so that a molar concentration ratio of iron to arsenic was adjusted to 3, and air bubbling was not carried out.

As a result, the arsenic precipitate rate was 98.97% and an arsenic content in a rhenium sulfide manufactured using this solution was 4.1%, and thus an amount of arsenic contained in the purified rhenium was higher, compared with that in Test Example 1.

The invention claimed is:

1. A method of separating rhenium and arsenic in a rhenium purification process, the rhenium purification process being such that a raw material containing rhenium and arsenic is oxidized and leached, and separated into a leachate containing perrhenic acid, arsenic acid, and arsenous acid and a leaching residue containing arsenate, followed by purification of rhenium from said leachate,
the method comprising:
a neutralization purification step of adding an alkali to the leachate to obtain an arsenic-containing precipitate and a rhenium-containing solution;
a rhenium separation step of separating rhenium from the rhenium-containing solution obtained in the neutralization purification step;
a precipitate decomposition step of adding an alkali to either or both the arsenic-containing precipitate obtained in the neutralization purification step and the leaching residue containing the arsenate to obtain an arsenic-containing solution and a hydroxide precipitate; and
an arsenic fixing step of fixing arsenic in the arsenic-containing solution obtained in the precipitate decomposition step, as a precipitate.

2. The method of separating rhenium and arsenic according to claim 1, wherein, in the neutralization purification step, before or at a same time as an alkali is added to the leachate, a water-soluble divalent iron compound is added to said leachate and also an oxidizing agent is added thereto, whereby arsenic in said leachate is transformed into a precipitate of iron arsenate.

3. The method of separating rhenium and arsenic according to claim 2, wherein air is used as the oxidizing agent and bubbling of said air is applied to the leachate.

4. The method of separating rhenium and arsenic according to claim 2, wherein a use of the oxidizing agent allows the above-mentioned leachate to have an oxidation-reduction potential of not less than −400 mV.

5. The method of separating rhenium and arsenic according to claim 2, wherein an amount of the water-soluble iron compound added is equivalent to an amount being such that the number of moles of trivalent iron in the leachate is not less than three times as much as the number of moles of pentavalent arsenic contained in said leachate.

6. The method of separating rhenium and arsenic according to claim 2, wherein, in the precipitate decomposition step, when an alkali is added to the precipitate containing arsenic and/or the leaching residue containing iron arsenate, pH is adjusted to a range of not less than 12.0 and not more than 13.3.

7. The method of separating rhenium and arsenic according to claim 6, wherein, the alkali to be added in the precipitate decomposition step is alkali hydroxide.

8. A method of purification of rhenium, wherein a raw material containing rhenium and arsenic is oxidized and leached, and separated into a leachate containing perrhenic acid, arsenic acid, and arsenous acid and a leaching residue containing arsenate, followed by purification of rhenium from said leachate,
the method comprising:
a neutralization purification step of adding an alkali to the leachate to obtain an arsenic-containing precipitate and a rhenium-containing solution;
a rhenium purification step of separating the rhenium-containing solution obtained in the neutralization purification step and adding a sulfurizing agent to the solution to obtain rhenium sulfide;
a precipitate decomposition step of adding an alkali to either or both the arsenic-containing precipitate obtained in the neutralization purification step and the leaching residue containing arsenate to obtain an arsenic-containing solution and a hydroxide precipitate; and
an arsenic fixing step of fixing arsenic in the arsenic-containing solution obtained in the precipitate decomposition step, as a precipitate.

* * * * *